United States Patent
Liu et al.

(10) Patent No.: US 10,306,392 B2
(45) Date of Patent: May 28, 2019

(54) CONTENT-ADAPTIVE SURROUND SOUND VIRTUALIZATION

(71) Applicant: Dolby Laboratories Licensing Corporation, San Francisco, CA (US)

(72) Inventors: Xin Liu, Beijing (CN); Lie Lu, San Francisco, CA (US); Alan J. Seefeldt, Alameda, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 15/772,383

(22) PCT Filed: Nov. 2, 2016

(86) PCT No.: PCT/US2016/060163
§ 371 (c)(1),
(2) Date: Apr. 30, 2018

(87) PCT Pub. No.: WO2017/079334
PCT Pub. Date: May 11, 2017

(65) Prior Publication Data
US 2018/0324540 A1    Nov. 8, 2018

Related U.S. Application Data

(60) Provisional application No. 62/253,761, filed on Nov. 11, 2015.

(30) Foreign Application Priority Data

Nov. 3, 2015 (CN) .......................... 2015 1 0738160
Dec. 8, 2015 (EP) ..................................... 15198483

(51) Int. Cl.
*H04S 5/00* (2006.01)
*H04S 7/00* (2006.01)
(Continued)

(52) U.S. Cl.
CPC ............ *H04S 5/005* (2013.01); *G06F 16/683* (2019.01); *G06F 17/18* (2013.01);
(Continued)

(58) Field of Classification Search
CPC ...... H04S 5/005; H04S 7/307; H04S 2400/03; H04S 2420/01; H04S 7/30; G06F 17/18;
(Continued)

(56) References Cited

U.S. PATENT DOCUMENTS 7,561,706 B2    7/2009  Holmi
8,054,980 B2   11/2011  Wu
(Continued)

FOREIGN PATENT DOCUMENTS

EP    1976114    11/2010
KR    0065972     6/2011
(Continued)

OTHER PUBLICATIONS

Dolby PCEE4 System http://www.dolby.com/us/en/consumer/technology/pc/dolby-home-theater-v4.html.
(Continued)

*Primary Examiner* — Sonia L Gay

(57) ABSTRACT

Example embodiments disclosed herein relate to content-adaptive surround sound virtualization. A method of virtualizing surround sound is disclosed. The method includes receiving a set of input audio signals, each of the input audio signals being indicative of sound from one of different sound sources, and determining a probability of the set of input audio signals belonging to a predefined audio content category. The method also includes determining a virtualization amount based on the determined probability, the virtualization amount indicating to which extent the set of input audio signals is virtualized as surround sound. The method further includes performing surround sound virtualization on two or
(Continued)

more input audio signals in the set based on the determined virtualization amount and generating output audio signals based on the virtualized input audio signals and other input audio signals in the set. Corresponding system and computer program product for virtualizing surround sound are also disclosed.

10 Claims, 5 Drawing Sheets

(51) Int. Cl.
*H04R 1/26* (2006.01)
*G06F 17/18* (2006.01)
*G06F 16/683* (2019.01)
*G06F 17/30* (2006.01)

(52) U.S. Cl.
CPC ......... *G06F 17/30743* (2013.01); *H04R 1/26* (2013.01); *H04S 5/00* (2013.01); *H04S 7/30* (2013.01); *H04S 7/307* (2013.01); *H04S 2400/03* (2013.01); *H04S 2420/01* (2013.01)

(58) Field of Classification Search
CPC ... G06F 17/30743; G06F 16/683; H04R 1/26; H04R 5/00
See application file for complete search history.

(56) References Cited

U.S. PATENT DOCUMENTS

| | | | |
|---|---|---|---|
| 8,199,933 B2 | 6/2012 | Seefeldt | |
| 8,335,331 B2 | 12/2012 | Johnston | |
| 8,440,901 B2 | 5/2013 | Nakadai | |
| 8,442,237 B2 | 5/2013 | Kim | |
| 2009/0157575 A1* | 6/2009 | Schobben | H04S 3/02 706/14 |
| 2010/0158261 A1 | 6/2010 | Takeuchi | |
| 2011/0243338 A1 | 10/2011 | Brown | |
| 2014/0219455 A1 | 8/2014 | Peters | |
| 2014/0270185 A1 | 9/2014 | Walsh | |
| 2015/0098597 A1* | 4/2015 | Kulavik | H04S 3/004 381/309 |
| 2015/0223002 A1 | 8/2015 | Mehta | |

FOREIGN PATENT DOCUMENTS

| | | |
|---|---|---|
| WO | 2007/127023 | 11/2007 |
| WO | 2009/011827 | 1/2009 |
| WO | 2014/099285 | 6/2014 |
| WO | 2014/122550 | 8/2014 |
| WO | 2014/160542 | 10/2014 |
| WO | 2014/160548 | 10/2014 |
| WO | 2014/160678 | 10/2014 |
| WO | 2015/103024 | 7/2015 |
| WO | 2015/105809 | 7/2015 |

OTHER PUBLICATIONS

Lu, L. et al "Automatic Mood Detection and Tracking of Music Audio Signals" IEEE Audio Speech and Language Processing, vol. 14, Issue 1, pp. 5-18, Jan. 2006.
Lu, H. et al "Content-based Audio Classification and Segmentation by Using Support Vector Machines," ACM Multimedia Systems Journal 8 (6), pp. 482-492, Mar. 2003.

* cited by examiner

CONTENT-ADAPTIVE SURROUND SOUND VIRTUALIZATION

CROSS-REFERENCE TO RELATED APPLICATIONS

This application claims priority from Chinese patent application No. 201510738160.0 filed 3 Nov. 2015; U.S. Provisional Patent Application No. 62/253,761 filed 11 Nov. 2015 and European Patent Application No. 201510738160.0 filed 3 Nov. 2015, which are hereby incorporated by reference in their entirety.

TECHNOLOGY

Example embodiments disclosed herein generally relate to surround sound virtualization, and more specifically, to a method and system for content-adaptive surround sound virtualization.

BACKGROUND

In traditional audio playback systems, multi-channel surround sound audio requires multiple speakers driven with signals in separate audio channels to create a "surround sound" listening experience. For example, 5-channel audio requires at least five speakers for left, center, right, left surround, and right surround channels. However, typically only two speakers are employed in the personal playback environment such as personal computers, earphones, or headphones. In order to achieve the surround sound listening experience with fewer speakers, a virtualizer can be set at the audio playback end to create the perception of sound sources of different channels.

Throughout this disclosure, the term "virtualizer" (or "virtualizer system") refers to a system coupled and configured to receive a set of N input audio signals (indicative of sound from a set of sound sources) and to generate a set of M output audio signals for reproduction by a set of M physical speakers (e.g., earphones, headphones, or loudspeakers) positioned at output locations different from locations of the sound sources, where each of N and M is a number greater than one. N can be equal to or different than M. A virtualizer generates (or attempts to generate) the output audio signals so that when reproduced, the listener perceives the reproduced signals as being emitted from the sound sources rather than the output locations of the physical speakers (the sound source locations and the output locations are relative to the listener).

One typical example of such a virtualizer is designed to virtualize a set of 5-channel input audio signals and drive two physical speakers to emit sound that a listener perceives as coming from the true 5-channel sources, and create virtual surround sound experience for the listener without the large number of speakers that are required in traditional audio playback systems. In general, if a virtualizer is configured at the playback end, it will fully work to perform virtualization on all input audio contents to produce a surround sound effect.

SUMMARY

Example embodiments disclosed herein propose a solution for content-adaptive surround sound virtualization.

In one aspect, example embodiments disclosed herein provide a method of virtualizing surround sound. The method includes receiving a set of input audio signals, each of the input audio signals being indicative of sound from one of different sound sources, and determining a probability of the set of input audio signals belonging to a predefined audio content category. The method also includes determining a virtualization amount based on the determined probability. The virtualization amount indicates to which extent the set of input audio signals is virtualized as surround sound. The method further includes performing surround sound virtualization on a pair of input audio signals in the set based on the determined virtualization amount and generating output audio signals based on the virtualized input audio signals and other input audio signals in the set. Embodiments in this regard further provide a corresponding computer program product.

In another aspect, example embodiments disclosed herein provide a system for virtualizing surround sound. The system includes an audio receiving unit configured to receive a set of input audio signals, each of the input audio signals being indicative of sound from one of different sound sources, and a content confidence determining unit configured to determine a probability of the set of input audio signals belonging to a predefined audio content category. The system also includes a virtualization amount determining unit configured to determine a virtualization amount based on the determined probability. The virtualization amount indicates to which extent the set of input audio signals is virtualized as surround sound. The system further includes a virtualizer configured to perform surround sound virtualization on a pair of input audio signals in the set based on the determined virtualization amount and to generate output audio signals based on the virtualized input audio signals and other input audio signals in the set.

Through the following description, it would be appreciated that in accordance with example embodiments disclosed herein, surround sound virtualization of input audio is adaptively controlled in a continuous manner via a virtualization amount determined based on the content type of the input audio. In this way, depending on different types of audio content received, the extent of surround sound virtualization is varied to avoid the case where the surround sound effect is not desirable for some types of audio content. Other advantages achieved by example embodiments disclosed herein will become apparent through the following descriptions.

DESCRIPTION OF DRAWINGS

Through the following detailed description with reference to the accompanying drawings, the above and other objectives, features and advantages of example embodiments disclosed herein will become more comprehensible. In the drawings, several example embodiments disclosed herein will be illustrated in an example and non-limiting manner, wherein.

Throughout the drawings, the same or corresponding reference symbols refer to the same or corresponding parts.

DESCRIPTION OF EXAMPLE EMBODIMENTS

Figure 1:
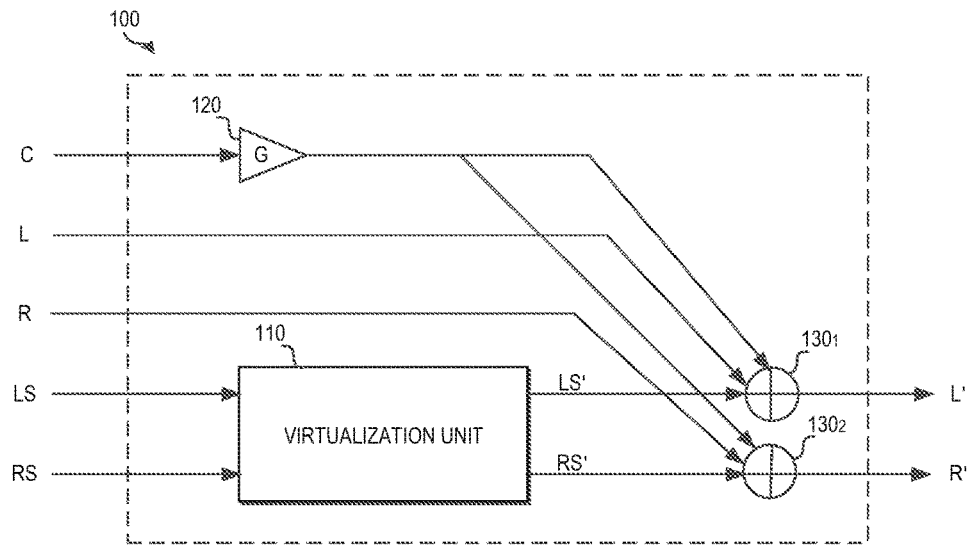
FIG. 1 is a block diagram of a conventional surround sound virtualizer system.

Principles of example embodiments disclosed herein will now be described with reference to various example embodiments illustrated in the drawings. It should be appreciated that depiction of those embodiments is only to enable those skilled in the art to better understand and further implement example embodiments disclosed herein, not intended for limiting the scope disclosed herein in any manner.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The term "one example embodiment" and "an example embodiment" are to be read as "at least one example embodiment." The term "another embodiment" is to be read as "at least one other embodiment".

In most typical surround sound virtualizer systems, in response to a set of multi-channel input audio signals, output signals are generated for at least two physical speakers positioned at output locations. FIG. 1 depicts a block diagram of a conventional surround sound virtualizer system 100. As shown, in this configuration, 5-channel audio signals are used as the input, including a center (C) channel signal indicative of sound from a center front source, a left (L) channel signal indicative of sound from a left front source, a right (R) channel signal indicative of sound from a right front source, a left-surround (LS) channel signal indicative of sound from a left rear source, and a right-surround (RS) channel signal indicative of sound from a right rear source.

The system 100 includes a virtualization unit 110 to generate virtual left and right surround outputs (LS' and RS') to virtualize sound that a listener perceives as coming from LS and RS sources. The system 100 also generates a phantom center channel signal by amplifying the center signal C in an amplifier 120 with the gain G. The amplified output of the amplifier 120 is combined with the input signal L and the left surround output LS' in a summation element 130$_1$ to generate a left output signal L', and is also combined with the input signal R and the right surround output RS' in a summation element 130$_2$ to generate a right output signal R'. The output signals L' and R' may be played back by two physical speakers, respectively, driving the physical speakers to emit sound that the listener perceives as being emitted from the five sound sources of the input audio signals.

Although the virtualizer can create a surround sound effect and provide cinematic experience for listeners, it is not applicable to reproduction of some types of audio content. In general, for movie content that is full of background sound, speech, and other sounds from various directions of source, the virtualizer may present an enjoyable surround sound effect, typically only with two speakers. However, for other audio content like pure music, the listeners may expect to switch off the virtualizer since surround sound virtualization may destroy the artistic intention of the music mixer and the sound image of virtualized music audio may be obscured or blurred. Thus, it is desired to apply suitable surround sound virtualization modes depending on the types of audio content.

One possible way to control the surround sound virtualizer for different audio content types is to design different sets of configurations in advance. Users are provided with options to select a suitable set of configurations for the audio content on playback. The virtualizer can be switched off for configurations corresponding to music, while is switched on for configurations corresponding to movie. However, it will be troublesome and annoying for users to frequently switch among the predesigned sets of configurations. As a result, the users will tend to keep using only one configuration set for all the contents, resulting in a poor user experience. In addition, since the virtualizer is usually turned on or off in a discrete manner among the predesigned configuration sets, this also may cause some audible artifacts in the audio at transition points.

Example embodiments disclosed herein propose a solution for automatically adapting the surround sound virtualizer based on audio content to playback. With the automatic mode, users can simply enjoy the audio content without considering the manual selection among different configurations. The virtualizer can be adaptively configured via a continuous virtualization amount instead of being switched on/off in a discrete manner, thereby avoiding the abrupt change of sound effect along with audio content.

Figure 2:
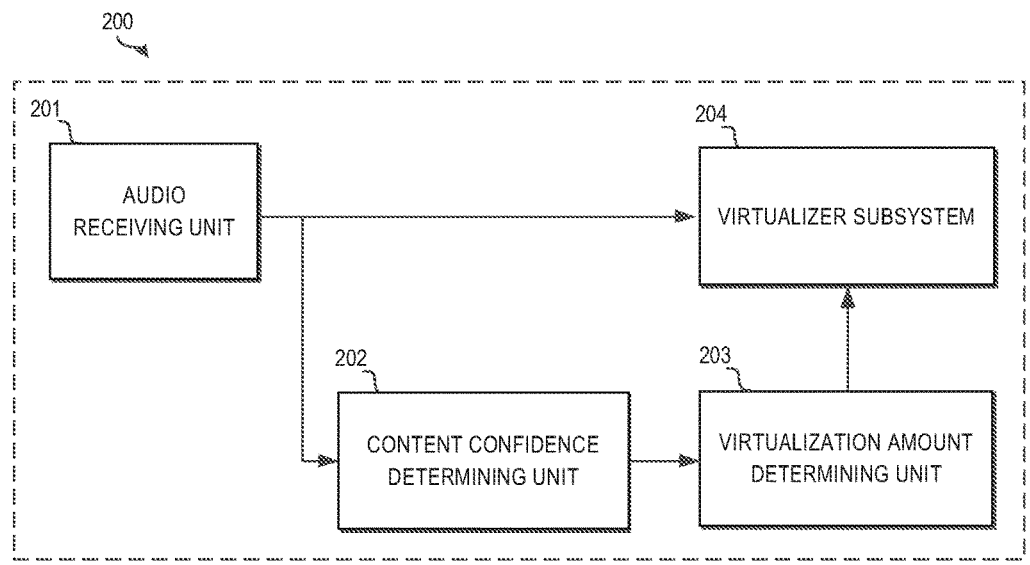
FIG. 2 is a block diagram of a surround sound virtualizer system in accordance with one example embodiment disclosed herein.

FIG. 2 depicts a block diagram of a surround sound virtualizer system 200 in accordance with one example embodiment disclosed herein. As shown, the system 200 includes an audio receiving unit 201, a content confidence determining unit 202, a virtualization amount determining unit 203, and a virtualizer subsystem 204.

In the system 200, the audio receiving unit 201 receives a set of N input audio signals to be played back, where N is a natural number greater than one. Each of the N input audio signals is indicative of sound from one of different sound sources. Examples of input audio signals may include, but are not limited to, 3-channel audio signals, 5-channel or 5.1-channel audio signals, and 7-channel or 7.1-channel audio signals. The set of input audio signals is provided to the virtualizer subsystem 204. The virtualizer subsystem 204 is used for performing surround sound virtualization on the N input audio signals so that the input audio signals can be virtualized as surround sound that a listener perceives as coming from the different sound sources. M output audio signals are generated by the virtualizer subsystem 204, where M is a natural number greater than one. Typically, M is dependent on the number of physical speakers at the playback end. In some personal playback environment such as personal computers, earphones, and headphones, M may be equal to two.

In example embodiments disclosed herein, the surround sound virtualization of the virtualizer subsystem 204 may be controlled on the basis of the audio content type identified from the input audio signals. The content confidence determining unit 202 and the virtualization amount determining unit 203 are used to determine a factor for controlling the surround sound virtualization. Specifically, the content confidence determining unit 202 is configured to receive the set of N input audio signals and determine a confidence score for the set. A confidence score indicates a probability of the set of input audio signals belonging to a predefined audio content category. The virtualization amount determining unit 203 is configured to determine a virtualization amount (denoted as "VA") based on the determined confidence score. The virtualization amount VA indicates to which extent the set of input audio signals is virtualized as surround sound. This surround sound may be perceived by a listener as coming from the different sound sources of the input audio signals.

In one example embodiment, in order to determine the confidence score, the content confidence determining unit 202 may first identify to which audio content category the set of the input audio signals belongs, and then estimate the probability of the set regarding the audio content category. Any suitable techniques for audio content identification, either currently known or to be developed in the future, can be used to identify the type of the audio signals. One or more audio content categories may be defined in advance. Examples of the categories include, but are not limited to, music, speech, background sound, noise, and the like. The number of the predefined categories may be determined depending on the desired granularity of audio content classification. In some example embodiments, the input audio signals may be a mixture of different types of audio content. In this case, confidence scores for some or all of the predefined categories may be estimated by the content confidence determining unit 202.

The virtualization amount VA may be provided to the virtualizer subsystem 204 to control the surround sound effect produced by this subsystem 204. In accordance with example embodiments disclosed herein, the virtualizer subsystem 204 is configured to perform surround sound virtualization on the set of input audio signals. To this end, the virtualizer subsystem 204 may virtualize a pair of input audio signals in the set based on the determined virtualization amount VA. Moreover, the virtualizer subsystem 204 generates a number of output audio signals based on the virtualized input audio signals and other input audio signals in the set. The number of output audio signals, as mentioned, is dependent on the number of physical speakers used. In some example embodiments, the number is larger than or equal to two, for example.

In general, the input audio signals are virtualized in units of a pair. In one example, for 5-channel or 5.1-channel audio signals, a pair of LS and RS channel signals may be processed to generate virtual surround signals. Alternatively, or in addition, a pair of L and R channel signals or a C channel signal and a signal mixed by L and R channel signals may also be virtualized. For 7-channel or 7.1 channel audio signals, except those pairs of audio signals as indicated for the 5-channel or 5.1-channel audio signals, a pair of signals in left-rear (LR) and right-rear (RR) channels may be alternatively or additionally processed. It is noted that which pair of audio signals is to be virtualized will not limit scope of the subject matter disclosed herein.

The virtualization amount VA may be valued from any suitable range of values to represent the extent of surround sound virtualization performed on the input audio signals. In one example embodiment, the virtualization amount VA may be valued from 0 to 1. In another example embodiment, the virtualization amount VA may a binary value of 0 or 1. If the virtualization amount VA is set to 1 (its highest value), the virtualizer subsystem 204 may fully work to present the surround sound effect. If the virtualization amount VA is down to 0 (its lowest value), the subsystem 204 may be regarded as being switched off. That is, the subsystem 204 may not perform extra processing on the audio signals if the virtualization amount VA has its lowest value, and the resulting output signals of the system 200 may then drive the physical speakers to emit sound that a listener perceives as coming from sources located at the physical speakers, instead of sources of the input audio signals. In the case where the virtualization amount VA is set as a value between the highest value and the lowest value, for example, between 1 and 0, the virtualizer subsystem 204 may not fully work to perform the surround sound virtualization. The determination of virtualization amount VA will be discussed in more detail below.

Figure 3:
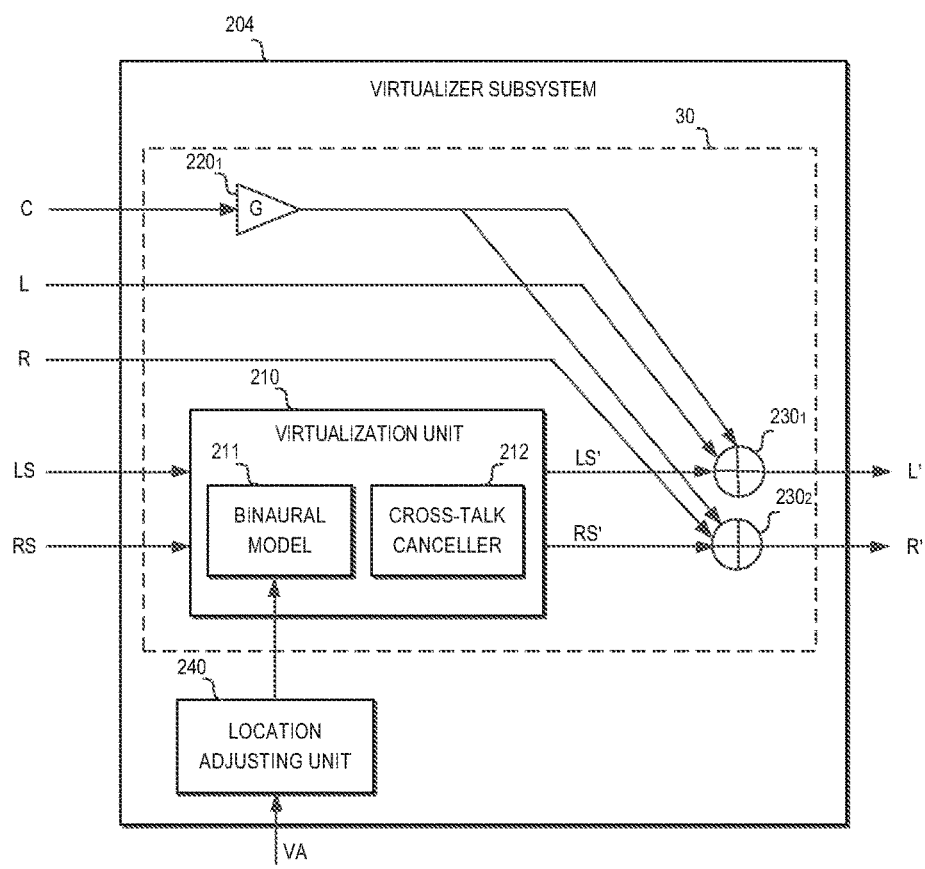
FIG. 3 is a block diagram of a virtualizer subsystem of the system in FIG. 2 in accordance with one example embodiment disclosed herein.

The virtualizer subsystem 204 may be configured in a variety of ways by using the determined virtualization amount VA. FIG. 3 depicts a block diagram of a virtualizer subsystem 204 of the system 200 in FIG. 2 with the virtualization amount VA as a control factor. It is noted that a detailed structure 30 supporting the surround sound virtualization is merely depicted as an illustrative example in the virtualizer subsystem 204 in FIG. 3 and the following FIGS. 4-5. The virtualizer subsystem 204 may include more, less, or other units or components which execute the functions of surround sound virtualization in the same manner as the units illustrated in FIG. 3 and the following FIGS. 4-5. It is also noted that 5-channel input audio signals and two output audio signals for reproduction by a pair of physical speakers are given for the purpose of illustration in examples of FIG. 3 and the following FIGS. 4-5. Audio signals in other formats may be used as input, and depending on the number of physical speakers for playback, the number of output signals may be more than two.

The structure 30 in the virtualizer subsystem 204 for realizing surround sound virtualization may be similar to that illustrated in FIG. 1. In the virtualizer subsystem 204, a virtualization unit 210 is used to virtualize the left-sound channel input LS and right-surround channel input RS to generate left and right surround outputs LS' and RS'. The virtualizer subsystem 204 also generates a phantom center channel signal by splitting the center channel input C with a gain G via an amplifier $220_1$. The virtualizer subsystem 204 then combines the outputs LS' and RS' with the L and R channel inputs and the phantom center channel signal via summation elements $230_1$ and $230_2$, to generate the left and right outputs L' and R'. The outputs L' and R' may be rendered over two physical speakers at physical locations relative to a listener, respectively.

During the virtualization process in the virtualization unit 210, a model may be used to virtualize the propagation process from the sound sources (of the input audio signals) to the human ears, so that it may be perceived by the listener that some virtual speakers located at the sound sources emit the sound. An example of such a model is a binaural model 211 as shown in FIG. 3. If the physical loudspeakers (as opposed to headphones) are used to present the output audio signals, an effort can be made to isolate the sound from the left loudspeaker to the left ear and from the right loudspeaker to the right ear. The virtualizer subsystem 204 may use a cross-talk canceller 212 to achieve this isolation. The cross-talk canceller 212 may be designed as the inverse process of sound propagation from the physical loudspeakers to the human ears.

In conventional virtualizer systems, the locations of the sound sources (for example, the locations of the virtual speakers) are predetermined and fixed. Therefore the output audio signals are always sounded as coming from the sources, generating a surround sound effect. In order to control the extent of surround sound effect, in the example of FIG. 3, the virtualizer subsystem 204 may further include a location adjusting unit 240 for adjusting location information that is utilized during the surround sound virtualization based on the virtualization amount VA. For example, the location information may be predetermined for sources of the input audio signals, represented as azimuths, such as −30 degrees for the front-left signal of a 5.1 surround-sound set of signals. By way of another example, the location information may be dynamic for sources of the input audio signals, represented as coordinates in a three dimensional space and received in metadata accompanying an object-based audio bit-stream representative of said sources (from which the input audio signals would be derived). Further examples will be readily apparent to a person of ordinary skill in the art.

The location adjusting unit 240 may be configured to adjust location information predetermined for sources of the pair(s) of input audio signals to be virtualized, based on the virtualization amount VA and the physical locations of the physical speakers. The physical locations of the physical features may be fixed, for example in a playback apparatus with integrated speakers, and so is at physical locations may be learned from the manufacturer of the playback apparatus and used to preconfigure the location adjusting unit 240. By way of another example, the physical speakers may be movable, in which case the respective physical locations thereof may be entered manually by the user, determined by a calibration method using a microphone which is (temporarily) located in the same environment as said physical speakers, or by some other suitable manner of obtaining said physical locations.

The adjusted location information may then be passed to the virtualization unit 210, for example, for use by the binaural model 211 as locations of the virtual speakers. According to the principle of surround sound virtualization, the positions of virtual speakers in the binaural model 211 may be directly related to the spatial image width of virtualized sound. If a virtual speaker is positioned to a target physical speaker, the binaural model 211 and the cross-talk canceller 212 may be regarded as being cancelled out and the virtualization unit 210 is thus regarded as being switched off. Therefore, the location adjusting unit 240 may adjust the position of virtual speakers via the virtualization amount VA, in order to simulate the behavior that the virtualization unit 210 can be adaptively enabled or disabled for different audio contents.

In some example embodiments disclosed herein, if the virtualization amount VA is determined to be large, it means that the virtualizer subsystem 204 is expected to fully work. In this case, the location adjusting unit 240 may adjust the locations of the virtual speakers (corresponding to the source locations of the input audio signals to be virtualized, in the example of FIG. 3, the source locations of the inputs LS and RS) towards their predetermined locations, so as to produce surround sound. In the case where the virtualization amount VA is small, the locations of the virtual speakers may be moved towards the locations of the physical speakers to reduce the surround sound effect of the output signals.

In one example embodiment, the location of each virtual speaker may be adjusted based on the virtualization amount VA and based on a difference between the predetermined locations for this virtual speaker and a position of a target physical speaker that is used to play back sound from the source of this virtual speaker. For example, the adjustment of location of a virtual speaker may be represented as below:

$$\theta_{i,virtual}^{s}=(\theta_{i,virtual}-\theta_{i,physical})*VA+\theta_{i,physical} \quad (1)$$

where $\theta_{i,virtual}$ represents the azimuth of a virtual speaker i predetermined in the binaural model 211, $\theta_{i,physical}$ represents the predetermined azimuth of a target physical speaker i that is used to playback sound from the source of the virtual speaker i, and $\theta_{i,virtual}^{s}$ represents the adjusted azimuth of the virtual speaker i. In the example of FIG. 3, the location of a virtual speaker that is corresponding to a sound source of the input LS may be adjusted in Equation (1) based on VA and the location of the physical speaker used to render the output signal L'.

The virtual speaker location that is corresponding to a sound source of the input RS may be similarly adjusted based on VA and the location of the other physical speaker used to render the output signal R'.

In one example embodiment, the location of each virtual speaker is a respective point in a two- or three-dimensional space, and adjustment of each said location is done with respect to a virtual line through a predefined listening location and the physical location of one of the physical speakers; the shortest distance between each said location and the virtual line is substantially zero when the virtualization amount VA is zero.

As can be seen from Equation (1), if the virtualization amount VA is determined to be 1, the locations of the virtual speakers may be set to their predetermined azimuths (for example, ±90° so that the virtualization unit 210 is fully engaged. With the decrease of the virtualization amount VA, azimuths of the virtual speakers may be gradually rotated towards the physical speakers, and the spatial image of output signals reproduced by the virtualizer subsystem 204 becomes narrow. When the virtualization amount VA is down to 0, the azimuths of the virtual speakers may coincide with those of the physical speakers in the cross-talk canceller 212 (for example, ±10°, and the acoustic effects of the binaural model 211 and cross-talk canceller 212 may be cancelled out. In this case, the outputs of the virtualizer subsystem 204 sound the same as the signals reproduced when the virtualization unit 210 is switched off.

In some example embodiments disclosed herein, according to the results of listening test, the azimuth change of virtual speakers may not linearly correlate with the width of the spatial image for virtualized outputs. When the value of VA is small, human ears have poor abilities of sound source localization for the corresponding azimuths, so the change of the spatial image becomes unremarkable in comparison with the larger VA. Thus, in some example embodiments disclosed herein, after determining the virtualization amount VA from the confidence scores, the virtualization amount determining unit 203 may further modify the determined virtualization amount VA in a nonlinear manner, for example, via some nonlinear mapping functions. Examples of nonlinear mapping functions include, but are not limited to, piecewise linear functions, power functions, exponential functions, or trigonometric functions. In this way, the virtualization amount may be revised to be linearly correlated with the width of the spatial image of the output signals.

In some further embodiments disclosed herein, the binaural model 211 may utilize head related transfer functions (HRTFs) or binaural room impulse responses (BRIRs) to represent the propagation process from the sound sources of the virtual speakers to the human ears, and the crosstalk cancellation may use the inverse. With the azimuth change of virtual speakers, the corresponding HRTFs or BRIRS of different locations of virtual sources may be individually calculated by using either the sophisticated data measured on acoustical manikins or some structural models, taking into account properties of the listening environment in the case of BRIRs. The resulting HRTFs or BRIRs may be stored in order to reduce the complexity of real-time computation. If the location information of the virtual speakers are predetermined and fixed, only one corresponding set of HRTFs' or BRIRs' coefficients is needed to be stored. However, with the adjustment of the location information, the storage of the HRTFs' or BRIRs' coefficients corresponding to all the available azimuths may tend to require large memory.

In order to save the memory space, in some example embodiments disclosed herein, a small number of sets of coefficients may be calculated and stored for HRTFs or BRIRs corresponding to different location information in advance. The azimuths of the prestored HRTFs or BRIRs can be either distributed evenly in the range between the predetermined locations of virtual speakers and physical loudspeakers, or distributed nonlinearly in consideration of the sound source localization abilities of human ears for different azimuths. The virtualizer subsystem $204$, for example, the virtualization unit $210$ in the subsystem $204$ may obtain a set of coefficients for HRTFs or BRIRs corresponding to the adjusted location information based on the predefined sets of coefficients.

In some example embodiments disclosed herein, if there is a predefined set of coefficients tor the HRTFs or BRIRs corresponding to the adjusted location information, the virtualization unit $210$ may directly select and use this set of coefficients. If there is no such a predefined set of coefficients, the virtualization unit $210$ may determine the set of coefficients for the HRTFs or BRIRs by interpolating predefined sets of coefficients for further HRTFs or BRIRs corresponding to further location information. For example, the set of coefficients for the HRTFs or BRIRs may be determined through linear interpolation according to those prestored sets of coefficients. As the number of prestored HRTFs' or BRIRs' coefficients decreases, the required memory space for HRTFs' or BRIRs' coefficients may also be reduced. In some examples, 5 sets of HRTFs' or BRIRs' coefficients may be preset for the azimuths between the locations of physical speakers and $\pm30°$, and additional 5 sets of HRTFs' or BRIRs' coefficients may be preset for the azimuths between $\pm30°$ and the predetermined locations of virtual speakers in the binaural model $211$. It is noted that any other number of sets of HRTFs' or BRIRs' coefficients may be prestored and the scope of the subject matter disclosed herein is not limited in this regard.

Figure 4:
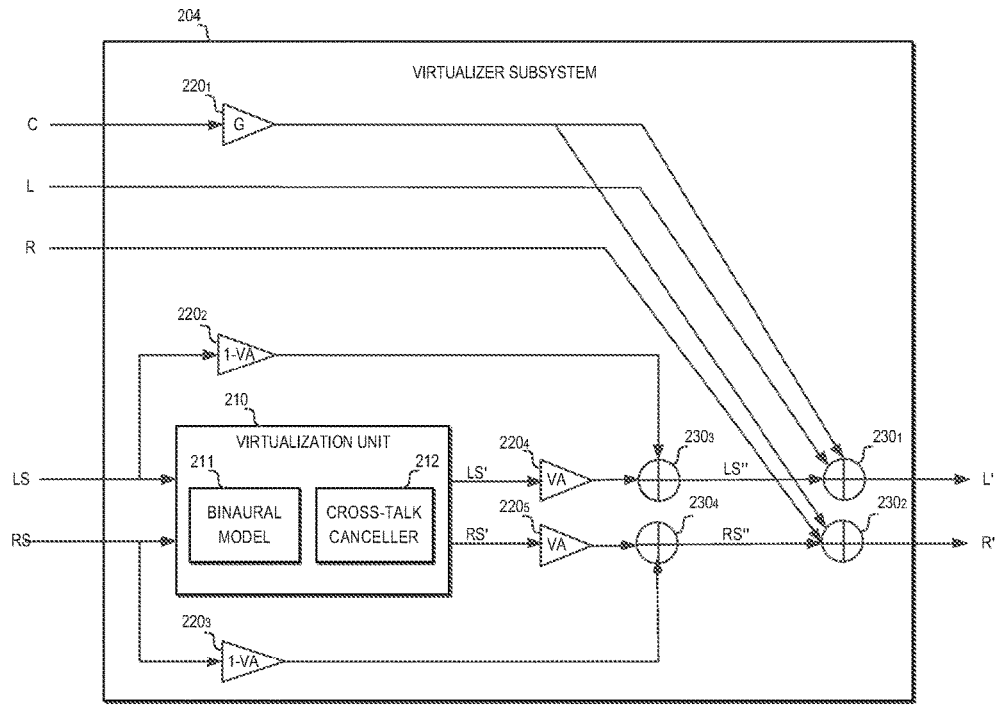
FIG. 4 is a block diagram of a virtualizer subsystem of the system in FIG. 2 in accordance with another example embodiment disclosed herein.

In some other example embodiments disclosed herein, the virtualization amount VA may be used as a mixing weight between the outputs when the virtualizer subsystem $204$ is switched on and switched off. FIG. 4 depicts a block diagram of such a system. In example of FIG. 4, the virtualization unit $210$ may perform normal surround sound virtualization on the pair of input audio signals LS and RS independently from the virtualization amount VA, to generate virtual surround outputs LS' and RS'. The virtual surround outputs LS' and RS' and the original input audio signal LS and RS may then be mixed based on the virtualization amount VA via (linear) interpolation. The direct interpolation can be made in either time or frequency domain.

As shown in FIG. 4, in addition to the units or modules used to realize surround sound virtualization as those in the structure $30$ of FIG. 3, the virtualizer subsystem $204$ may further include additional amplifiers $220_2$-$220_5$ and summation elements $230_3$ and $230_4$ to control the surround sound virtualization of the subsystem $204$ on the basis of the virtualization amount VA. The amplifiers $220_2$-$220_5$ and summation elements $230_3$ and $230_4$ may be regarded as a mixing structure added into the subsystem $204$.

In some example embodiments disclosed herein, the amplifiers $220_2$ and $220_3$ are configured to amplify the original inputs LS and RS via a gain (1-VA), respectively, while the amplifiers $220_4$ and $220_5$ are configured to use a gain VA to amplify the virtual outputs LS' and RS' from the virtualization unit $210$, respectively. The amplified signals of the amplifier $220_2$ and $220_4$ are combined by the summation elements $230_3$ to generate the output LS", and the amplified signals of the amplifier $220_3$ and $220_5$ are combined by the summation elements $230_4$ to generate the output RS". The mixing procedure may be represented, for example, as follow:

$$LS''=(1-VA)*LS+VA*LS' \qquad (2)$$

$$RS''=(1-VA)*RS+VA*RS' \qquad (3)$$

With the mixing procedure, if the virtualization amount VA is set to 0, the virtualization unit $210$ may be regarded as being switched off, and the input signals LS and RS may be rendered by the physical speakers without extra virtualization processing by the unit $210$. With the increase of virtualization amount VA, more signals virtualized by the virtualization unit $210$ may be mixed so that the surround sound effect is gradually enhanced. The resulting mixing signals (LS" and RS") may then be combined with the front channel signals L, R, and C to produce the outputs L' and R'.

Figure 5:
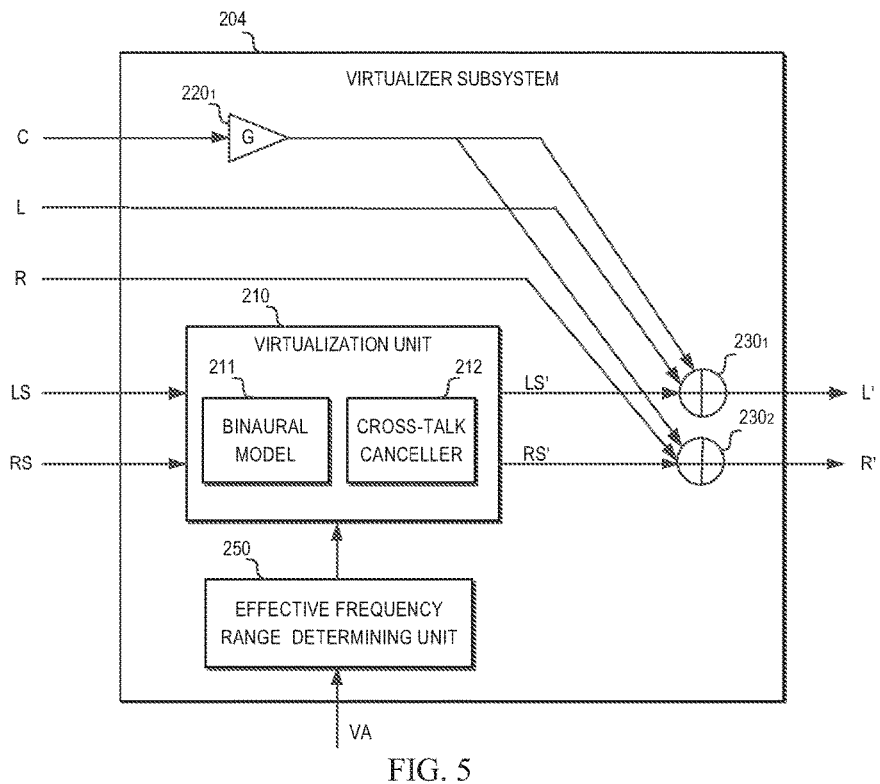
FIG. 5 is a block diagram of a virtualizer subsystem of the system in FIG. 2 in accordance with yet another example embodiment disclosed herein.

In some use cases, the audio signals to be virtualized, such as the signals LS and RS, may be processed in the frequency domain. The surround sound virtualization may be performed on a frequency-range basis considering for example, the robustness against uncertainties of HRTFs or BRIRs and head movement at high frequencies. In some example embodiments disclosed herein, the virtualization amount VA may be used to control the effective frequency range to be processed in the virtualizer subsystem $204$. FIG. 5 depicts a block diagram of a virtualizer subsystem $204$ in these embodiments.

In the example of FIG. 5, the virtualizer subsystem $204$ includes an effective frequency range determining unit $250$ configured to determine, based on the virtualization amount VA, an effective frequency range for the surround sound virtualization performed in the virtualization unit $210$. The virtualization amount VA may be used to tune the upper and/or lower limit of the effective frequency range. Based on the determining result of the unit $250$, the virtualization unit $210$, including the binaural model $211$ and the cross-talk canceller $212$, may process the audio signals in the effective frequency range. When the virtualization amount VA is set to 1, the full-band surround sound virtualization may be implemented. With the decrease of virtualization amount VA, the effective bandwidth to be processed may be lowered down so that the surround sound effect can be weakened. If the virtualization amount VA is a value between 0 and 1, the effective frequency range determining unit $250$ may determine one or more effective frequency ranges which bandwidths are lower than the full-band range. The determined multiple effective frequency ranges may be discontinuous. When the virtualization amount VA is down to 0, the virtualization unit $210$ may be equivalently disabled. Therefore, by controlling the effective frequency range by the virtualization amount, the surround sound virtualization of the unit $210$ may be adaptively configured for different types of audio content.

It would be appreciated that although only one virtualization unit 210 is used to virtualize the signals LS and RS of the 5-channel inputs in the examples of FIGS. 3-5, the virtualizer subsystem 204 may alternatively or additionally include some further virtualization units that function in the same manner as the unit 210 to process other pairs of input audio signals, such as a pair of signals L and R. The location adjusting unit 240 of FIG. 3, the amplifiers $220_2$-$220_5$ and summation elements $230_3$-$230_4$ of FIG. 4, and/or the effective frequency range determining unit 250 of FIG. 5 may also be configured to control the surround sound virtualization of all the virtualization units based on the virtualization amount VA.

Referring back to FIG. 2, as discussed above, the virtualization amount VA determined in the virtualization amount determining unit 203 of FIG. 2 is used to tune the surround sound virtualization in the virtualizer subsystem 204 in a continuous manner In some example embodiments disclosed herein, the virtualization amount VA may be estimated via some steering functions according to the probabilities (confidence scores) for predefined audio content categories from the content confidence determining unit 202. In one example embodiment, audio content may be roughly classified as a category of music and a category of non-music. In some other example embodiments, audio content may be classified into finer categories. For example, the category of non-music may be further divided into a subcategory of speech, a subcategory of background sound, and/or a subcategory of noise.

As mentioned, it is desired to automatically disable the surround sound effect for music content. Thus, in some example embodiments, the virtualization amount VA may only correlate to the confidence score for the category of music. The virtualization amount determining unit 203 may be configured to set the virtualization amount VA based on the confidence score for the category of music determined by the content confidence determining unit 202. The virtualization amount VA may be determined as a decreasing function of a probability of the set of input audio signals belonging to the category of music, which probability is corresponding to the confidence score. In this manner, when the confidence score for the category of music is in a high level, the virtualization amount VA may approach to 0 and the virtualized surround sound effect will be significantly weakened as discussed above. In one example embodiment, the virtualization amount VA may be negatively proportional to the confidence score for the category of music. For example, when the virtualization amount VA is valued from 0 to 1, VA may be set to be proportional to a difference between 1 and the confidence score for the category of music, which may be represented as follow:

$$VA \propto (1\text{-MCS}) \quad (4)$$

where $\propto$ represents "proportional to," and MCS represents the confidence score (probability) for the category of music, which is valued from 0 to 1.

Alternatively, or in addition, in some example embodiments disclosed herein, it is desired to enable the surround sound effect for non-music content, such as movie content. The virtualization amount VA may also correlate to the confidence score for the category of non-music. In one example embodiment, the virtualization amount determining unit 203 may be configured to determine the virtual amount VA based on the confidence score for the category of non-music. In one example embodiment, the virtual amount VA may be set as an increasing function of a probability that the set of input audio signals belongs to the category of non-music, which probability is corresponding to the confidence score. For example, the virtual amount VA may be positively proportional to the confidence score for the category of non-music.

In some cases, only a high confidence score for the music or non-music category is not enough to determine that music or non-music content is predominant in an audio segment of the input audio signals because different types of audio contents are identified independently. If the audio segment has also relatively rich non-music content, the virtualized surround sound effect may not be obviously suppressed although the value of the confidence score for the music category is large. Therefore, in addition to the confidence score for the music category, confidence scores for other audio content categories (for example, the confidence score for the non-music category) may also be jointly considered in the determination of the virtualization amount VA.

In one example embodiment, the virtualization amount determining unit 203 may be configured to set the virtualization amount VA based on the confidence scores for the music category and for the non-music category. The virtualization amount VA may be set to be negatively correlated to the confidence score for the music category and be positively correlated to the confidence score for the non-music category. In this way, when the confidence score for the non-music category is in a high level, the virtualization amount VA may approach to 1 and the virtualized surround sound effect will be significantly enhanced. If there is no non-music content included in the audio segment, the input audio signals may be identified as pure music and the virtualization amount VA can be set to 0.

In one example where the virtualization amount VA is valued from 0 to 1, the confidence score for the category of music may be weighted by the confidence score for the category of non-music and the virtualization amount VA may be determined to be negatively proportional to the weighted confidence score for the category of music. For example, the relation between the virtualization amount VA and the confidence scores for the categories of music and non-music may be represented as follow:

$$VA \propto (1\text{-MCS}*(1\text{-nonMCS}^P)) \quad (5)$$

where MCS represents the confidence score for the category of music, nonMCS represents the confidence score for the category of non-music, P represents a weighting coefficient for nonMCS, and $\propto$ represents "proportional to." MCS and nonMCS may be valued from 0 to 1. In some examples, P may be set as 1, 2, or 3 according to different application scenarios. It can be seen from Equation (5) that the confidence score for the non-music category is used to weight the effect of the confidence score for the music category on the virtualization amount VA. The virtualization amount VA may be set to be positively correlated to the confidence score for the non-music category and negatively correlated to the confidence score for the music category.

In some example embodiments disclosed herein, the confidence score for the category of non-music may be represented as a joint confidence score for all the non-music contents, such as speech, background sound, and noise. The content confidence determining unit 202 may determine probabilities of the set of input audio signals belonging to respective subcategories of speech, background sound, and noise. The determined probabilities may be used as confidence scores for those subcategories. The content confidence determining unit 202 may then estimate the confidence score for the category of non-music based on the confidence scores for the subcategories. For example, the confidence score for the category of non-music may be determined as a function of the confidence scores for its subcategories, which may be represented as follow:

$$\text{nonMCS} = f(\text{SCS}, \text{BCS}, \text{NCS}) \quad (6)$$

where nonMCS represents the confidence score for the category of non-music, SCS represents the confidence core of the subcategory of speech, BCS represents the confidence core of the subcategory of background sound, NCS represents the confidence core of the subcategory of noise, and $f(\cdot)$ represents a mapping function between nonMCS and other confidence scores, SCS, BCS, and NCS. nonMCS, SCS, BCS, and NCS may be valued from 0 to 1. The function $f(\cdot)$ may be a maximum function, an average function, a weighted average function, or the like. It is noted that some but not all of SCS, BCS, and NCS may be considered when determining nonMCS.

In some example embodiments disclosed herein, the confidence scores and the virtualization amount VA may be continuously determined for the incoming audio segments. In order to avoid abrupt changes of virtualization amount VA and to control the behavior of the virtualizer subsystem 204 more smoothly over time, some smoothing methods may be applied. Different parameters discussed above can be smoothed, such as one or more of the confidence scores of different audio content categories/subcategories, as well as the virtualization amount VA.

Each of the parameters determined for the current input audio segment (for example, the current audio frame) may be smoothed from the corresponding parameter determined for the previous audio segment. In one example embodiment, by utilizing a weighted average smoothing method, a parameter determined for the current input audio segment and the corresponding parameter determined for the previous audio segment may have respective contributions to the smoothed parameter. The contributions are dependent upon a smoothing factor. For example, the weighted average method for smoothing a parameter may be utilized as follow:

$$\text{Para}_{smooth}(n) = \alpha * \text{Para}_{smooth}(n-1) + (1-\alpha) * \text{Para}(n) \quad (7)$$

where n represents a frame index, Para(n) represents the parameter determined for the frame n, $\text{Para}_{smooth}(n)$ represents the smoothed parameter for the frame n, $\text{Para}_{smooth}(n-1)$ represents the smoothed parameter for the frame n−1, and α represents a smoothing factor in the range of 0 to 1. The larger the value of the smoothing factor α, the more smoothly the parameter changes. The time constant of the smoothing factor α may be set as 0.5 s, 1 s, 2 s, or the like, according to different application scenarios. It is noted that other smoothing functions, such as an asymmetric smoothing function or a piecewise smoothing function, can be designed in the similar way.

In some further example embodiments disclosed herein, in order to regulate the dynamic range of the virtualization amount VA, a scaling and/or sigmoid-like function may also be adopted in the virtualization amount determining unit 203. In one example embodiment, the virtualization amount determining unit 203 may be configured to restrict the value of the virtualization amount VA in the range between 0 and 1. There are various scaling functions that can be utilized to scale the virtualization amount VA and two example functions are presented as follow:

$$h(\text{VA}) = \min(\max(\text{sigmoid}(a*\text{VA}+b),0),1) \quad (8)$$

$$\text{or, } h(\text{VA}) = \min(\max(a*\text{VA}+b,0),1) \quad (9)$$

where h(VA) represents the modified virtualization amount, sigmoid (•) represents a sigmoid function, max (•) represents a maximum function, min (•) represents a minimum function, and factors a and b represent the gain and bias used to restrict the virtualization amount.

Figure 6:
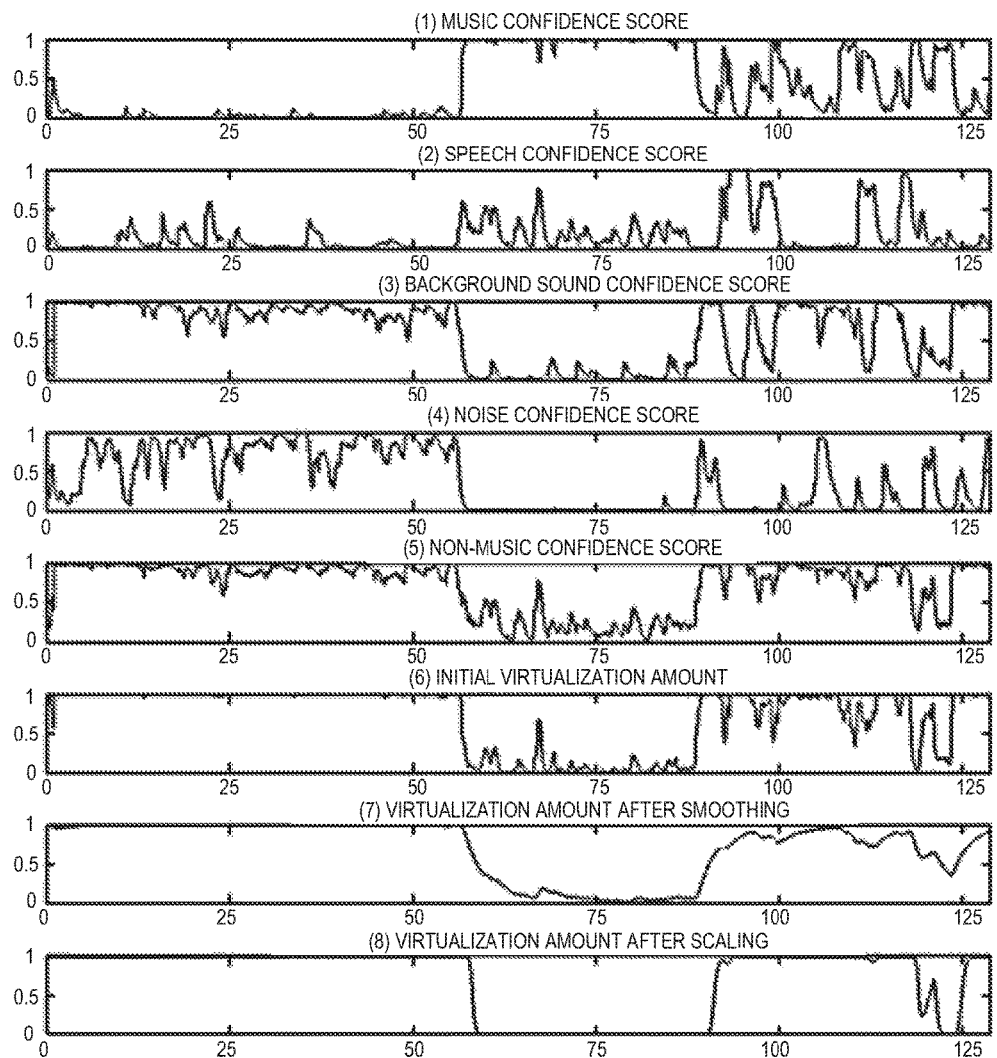
FIG. 6 shows schematic curve graphs of confidence scores and virtualization amounts for an example input audio clip in accordance with one example embodiment disclosed herein.

With the smoothing and scaling processes, the virtualization amount VA may be set to a suitable value in different application scenarios. FIG. 6 shows schematic curve graphs of confidence scores and virtualization amounts for an example input audio clip in accordance with one example embodiment disclosed herein. The input audio clip analyzed in FIG 6 is a concatenation of a piece of sound effect having background sound and noise (with the length of 1 minute), a piece of pop music (with the length of 34 seconds), and a piece of movie audio (with the length of 43 seconds). It is noted that this audio clip is merely given as an illustrative example.

The change curve of the confidence score for music in the audio clip is shown in Graph (1) of FIG. 6. In Graphs (2)-(4), the change curves of the confidence scores of speech, background sound, and noise are shown. Based on the confidence scores of speech, background sound, and noise, the confidence score for non-music is calculated for example, by Equation (6), and the result is shown in Graph (5). The initial virtualization amount VA in Graph (6) is determined based on the confidence score for music in Graph (1) and the confidence score for non-music in Graph (5). The initial virtualization amount VA may be further smoothed for example, by Equation (7), to avoid abrupt changes, and Graph (7) shows the smoothed curve of the virtualization amount VA. Alternatively, or in addition, the virtualization amount VA may also be scaled for example, by Equation (8), to obtain the curve as shown in Graph (8).

It is to be understood that the components of the system 200 may be a hardware module or a software unit module. For example, in some example embodiments, the system may be implemented partially or completely as software and/or in firmware, for example, implemented as a computer program product embodied in a computer readable medium. Alternatively, or in addition, the system may be implemented partially or completely based on hardware, for example, as an integrated circuit (IC), an application-specific integrated circuit (ASIC), a system on chip (SOC), a field programmable gate array (FPGA), and so forth. The scope of the subject matter disclosed herein is not limited in this regard.

Figure 7:
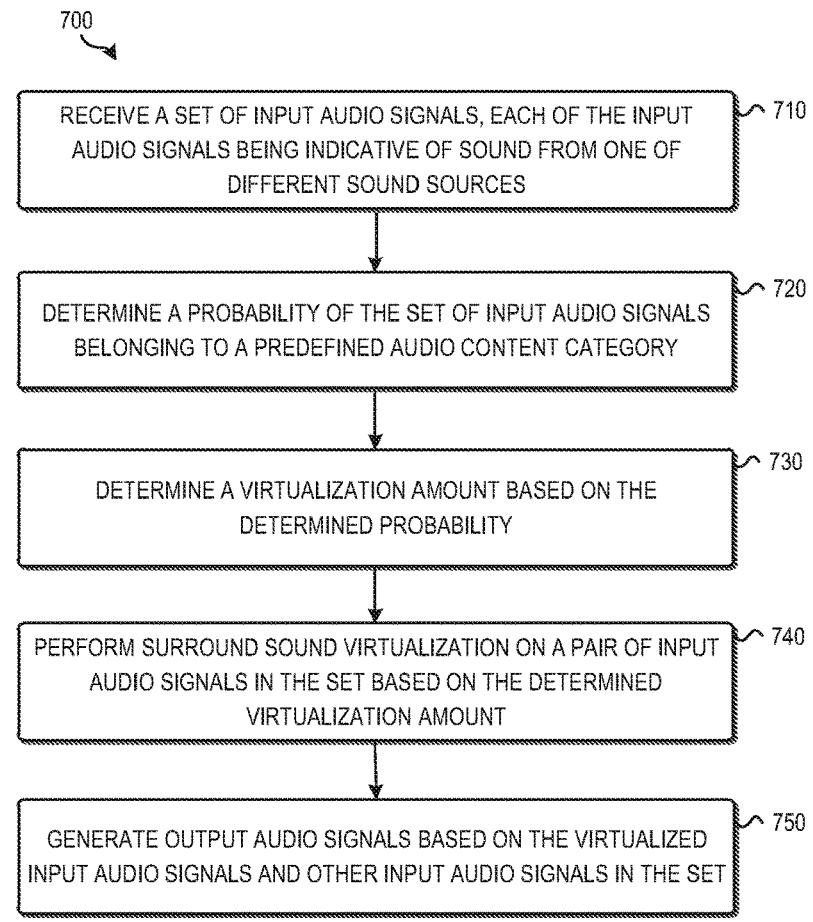
FIG. 7 is a flowchart of a method of virtualizing surround sound in accordance with one example embodiment disclosed herein.

FIG. 7 depicts a flowchart of a method of virtualizing surround sound 700 in accordance with one example embodiment disclosed herein. The method 700 is entered in step 710, where a set of input audio signals is received, each of the input audio signals being indicative of sound from one of different sound sources. In step 720, it is determined a probability of the set of input audio signals belonging to a predefined audio content category is determined. Then, a virtualization amount is determined in step 730 based on the determined probability. The virtualization amount indicates to which extent the set of input audio signals is virtualized as surround sound. In step 740, surround sound virtualization is performed on a pair of input audio signals in the set based on the determined virtualization amount, and in step 750, output audio signals are generated based on the virtualized input audio signals and other input audio signals in the set.

In some example embodiments disclosed herein, the output signals may be used to drive physical speakers at physical locations relative to a listener. In some example embodiments disclosed herein, predetermined location information for sound sources of the pair of input audio signals may be adjusted based on the virtualization amount and the physical locations of the physical speakers, and the surround sound virtualization may be then performed on the pair of input audio signals based on the adjusted location information.

In some example embodiments disclosed herein, the virtualization amount may be modified in a nonlinear manner In some example embodiments disclosed herein, the predetermined location information may be adjusted based on the modified virtualization amount.

In some example embodiments disclosed herein, a set of coefficients for HRTFs or BRIRs corresponding to the adjusted location information may be obtained and the pair of input audio signals may be processed based on the obtained set of coefficients.

In some example embodiments disclosed herein, in response to finding a predefined set of coefficients for the HRTFs or BRIRs corresponding to the adjusted location information, the predefined set of coefficients may be selected for processing the pair of input audio signals. In some example embodiments disclosed herein, in response to missing the predefined set of coefficients for the HRTFs or BRIRs corresponding to the adjusted location information, the set of coefficients for the HRTFs or BRIRs may be determined by interpolating predefined sets of coefficients for further HRTFs or BRIRs corresponding to further location information.

In some example embodiments disclosed herein, the surround sound virtualization may be performed on the pair of input audio signals independently from the virtualization amount. Then the pair of original input audio signals and the virtualized input audio signals may be mixed based on the virtualization amount.

In some example embodiments disclosed herein, an effective frequency range may be determined for the pair of input audio signals based on the virtualization amount. The surround sound virtualization may be performed on the at least one pair of input audio signals in the determined effective frequency range.

In some example embodiments disclosed herein, the predefined audio content category may include a category of music. In some example embodiments disclosed herein, the virtualization amount may be determined as a decreasing function of a probability of the set belonging to the category of music.

In some example embodiments disclosed herein, the predefined audio content category may include a category of non-music. In some example embodiments disclosed herein, the virtualization amount may be determined as an increasing function of a probability of the set belonging to the category of non-music In some example embodiments disclosed herein, the category of non-music may include at least two of a subcategory of speech, a subcategory of background sound, or a subcategory of noise. In some example embodiments disclosed herein, a probability of the set belonging to each of the at least two subcategories may be determined and the probability of the set belonging to the category of non-music may be determined based on the determined probabilities for the at least two subcategories.

Figure 8:
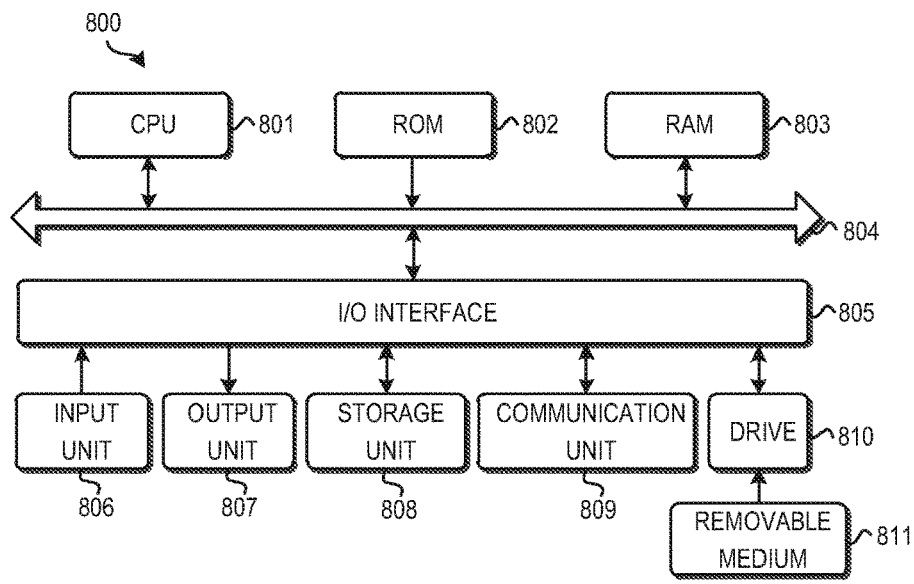
FIG. 8 is a block diagram of an example computer system suitable for implementing example embodiments disclosed herein.

FIG. 8 depicts a block diagram of an example computer system 800 suitable for implementing example embodiments disclosed herein. As depicted, the computer system 800 comprises a central processing unit (CPU) 801 which is capable of performing various processes in accordance with a program stored in a read only memory (ROM) 802 or a program loaded from a storage unit 808 to a random access memory (RAM) 803. In the RAM 803, data required when the CPU 801 performs the various processes or the like is also stored as required. The CPU 801, the ROM 802 and the RAM 803 are connected to one another via a bus 804. An input/output (I/O) interface 805 is also connected to the bus 804.

The following components are connected to the I/O interface 805: an input unit 806 including a keyboard, a mouse, or the like; an output unit 807 including a display such as a cathode ray tube (CRT), a liquid crystal display (LCD), or the like, and a loudspeaker or the like; the storage unit 808 including a hard disk or the like; and a communication unit 809 including a network interface card such as a LAN card, a modem, or the like. The communication unit 809 performs a communication process via the network such as the internet. A drive 810 is also connected to the I/O interface 805 as required. A removable medium 811, such as a magnetic disk, an optical disk, a magneto-optical disk, a semiconductor memory, or the like, is mounted on the drive 810 as required, so that a computer program read therefrom is installed into the storage unit 808 as required.

Specifically, in accordance with example embodiments disclosed herein, the method described above with reference to FIG. 7 may be implemented as computer software programs. For example, example embodiments disclosed herein comprise a computer program product including a computer program tangibly embodied on a machine readable medium, the computer program including program code for performing the method 700. In such embodiments, the computer program may be downloaded and mounted from the network via the communication unit 809, and/or installed from the removable medium 811.

Generally speaking, various example embodiments disclosed herein may be implemented in hardware or special purpose circuits, software, logic or any combination thereof. Some aspects may be implemented in hardware, while other aspects may be implemented in firmware or software which may be executed by a controller, microprocessor or other computing device. While various aspects of the example embodiments disclosed herein are illustrated and described as block diagrams, flowcharts, or using some other pictorial representation, it would be appreciated that the blocks, apparatus, systems, techniques or methods disclosed herein may be implemented in, as non-limiting examples, hardware, software, firmware, special purpose circuits or logic, general purpose hardware or controller or other computing devices, or some combination thereof.

Additionally, various blocks shown in the flowcharts may be viewed as method steps, and/or as operations that result from operation of computer program code, and/or as a plurality of coupled logic circuit elements constructed to carry out the associated function(s). For example, example embodiments disclosed herein include a computer program product comprising a computer program tangibly embodied on a machine readable medium, the computer program containing program codes configured to carry out the methods as described above.

In the context of the disclosure, a machine readable medium may be any tangible medium that can contain, or store a program for use by or in connection with an instruction execution system, apparatus, or device. The machine readable medium may be a machine readable signal medium or a machine readable storage medium. A machine readable medium may include, but not limited to, an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing.

Computer program code for carrying out methods disclosed herein may be written in any combination of one or more programming languages. These computer program codes may be provided to a processor of a general purpose computer, special purpose computer, or other programmable data processing apparatus, such that the program codes, when executed by the processor of the computer or other programmable data processing apparatus, cause the functions/operations specified in the flowcharts and/or block diagrams to be implemented. The program code may execute entirely on a computer, partly on the computer, as a stand-alone software package, partly on the computer and partly on a remote computer or entirely on the remote computer or server. The program code may be distributed on specially-programmed devices which may be generally referred to herein as "modules". Software component portions of the modules may be written in any computer language and may be a portion of a monolithic code base, or may be developed in more discrete code portions, such as is typical in object-oriented computer languages. In addition, the modules may be distributed across a plurality of computer platforms, servers, terminals, mobile devices and the like. A given module may even be implemented such that the described functions are performed by separate processors and/or computing hardware platforms.

As used in this application, the term "circuitry" refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present. Further, it is well known to the skilled person that communication media typically embodies computer readable instructions, data structures, program modules or other data in a modulated data signal such as a carrier wave or other transport mechanism and includes any information delivery media.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the subject matter disclosed herein or of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub-combination.

Various modifications, adaptations to the foregoing example embodiments disclosed herein may become apparent to those skilled in the relevant arts in view of the foregoing description, when read in conjunction with the accompanying drawings. Any and all modifications will still fall within the scope of the non-limiting and example embodiments disclosed herein. Furthermore, other embodiments disclosed herein will come to mind to one skilled in the art to which those embodiments pertain having the benefit of the teachings presented in the foregoing descriptions and the drawings.

Accordingly, the present subject matter may be embodied in any of the forms described herein. For example, the following enumerated example embodiments (EEEs) describe some structures, features, and functionalities of some aspects of the subject matter disclosed herein.

EEE 1. A method of automatically configuring a surround sound virtualizer by tuning a virtualization amount in a continuous manner, the virtualization amount being estimated on the basis of input audio content identified by audio classification techniques.

EEE 2. The method according to EEE 1, the audio content includes audio types such as music, speech, background sound, and noise.

EEE 3. The method according to EEE 1, the virtualization amount is used to drive the azimuth of virtual speakers in the virtualizer.

EEE 4. The method according to EEE 1, the virtualization amount is used to make a mixing between the outputs reproduced when the virtualizer is switched on or switched off.

EEE 5. The method according to EEE 1, the virtualization amount is used to adjust the effective frequency band to be processed in the virtualizer.

EEE 6. The method according to EEE 1, the virtualization amount can be set proportional to (1-MCS), where MCS represents a confidence score of music.

EEE 7. The method according to EEE 1, the virtualization amount can be set proportional to $(1-MCS*(1-nonMCS^P))$, where MCS represents a confidence score of music, non-MCS represents a confidence score of non-music, and P represents a weighting coefficient.

EEE 8. The method according to EEE 7, nonMCS can be set based on maximum, average, or weighted average of SCS, BCS, and NCS, where SCS represents a confidence score of speech, BCS represents a confidence score of background sound, and NCS represents a confidence score of noise.

EEE 9. The method according to EEE 7, one or more of parameters of MCS, nonMCS, SCS, NCS,BCS, as well as the virtualization amount can be smoothed in order to avoid abrupt changes and to obtain more smooth estimation of the parameters.

EEE 10. The method according to EEE 9, weighted average smoothing, asymmetric smoothing, or piecewise smoothing can be adopted in the smoothing of the parameters.

EEE 11. The method according to EEE 7, the dynamic range of the virtualization amount can be regulated based on the scaling and/or sigmoid-like functions.

EEE 12. The method according to EEE 3, the virtualization amount can be revised via some nonlinear mapping functions, such as piecewise linear functions, power functions, exponential functions, or trigonometric functions, in order to make the virtualization amount linearly correlate with the width of spatial image for virtualized audio signals.

EEE 13. The method according to EEE 3, only the HRTFs' or BRIRs' coefficients corresponding to a few azimuths of virtual speakers are pre-calculated and stored, and other HRTFs' or BRIRs' coefficients are obtained though linear interpolation according to these preset coefficients, in order to reduce the required memory space.

It would be appreciated that the embodiments of the subject matter disclosed herein are not to be limited to the specific embodiments disclosed and that modifications and other embodiments are intended to be included within the scope of the appended claims. Although specific terms are used herein, they are used in a generic and descriptive sense only and not for purposes of limitation.

Various aspects of the present invention may be appreciated from the following numbered example embodiments (NEESs):

NEE 1. A method of virtualizing surround sound, comprising:
receiving a set of input audio signals, each of the input audio signals being indicative of sound from one of different sound sources;
determining a probability of the set of input audio signals belonging to a predefined audio content category;
determining a virtualization amount based on the determined probability, the virtualization amount indicating to which extent the set of input audio signals is virtualized as surround sound;
performing surround sound virtualization on a pair of input audio signals in the set based on the determined virtualization amount; and
generating output audio signals based on the virtualized input audio signals and other input audio signals in the set.

NEE 2. The method according to NEE 1, wherein the output signals are used to drive physical speakers at physical locations relative to a listener, and
wherein performing the surround sound virtualization comprises:
adjusting predetermined location information for sound sources of the pair of input audio signals based on the virtualization amount and the physical locations of the physical speakers; and
performing the surround sound virtualization on the pair of input audio signals based on the adjusted location information.

NEE 3. The method according to NEE 2, further comprising:
modifying the virtualization amount in a nonlinear manner, and
wherein adjusting the predetermined location information comprises:
adjusting the predetermined location information based on the modified virtualization amount.

NEE 4. The method according to any of NEEs 2-3, wherein performing the surround sound virtualization on the pair of input audio signals based on the adjusted location information comprises:
obtaining a set of coefficients for head related transfer functions (HRTFs) binaural room impulse responses (BRIRs) corresponding to the adjusted location information; and
processing the pair of input audio signals based on the obtained set of coefficients.

NEE 5. The method according to NEE 4, wherein obtaining a set of coefficients for HRTFs corresponding to the adjusted location information comprises:
in response to finding a predefined set of coefficients for the HRTFs or BRIRs corresponding to the adjusted location information, selecting the predefined set of coefficients; and
in response to missing the predefined set of coefficients for the HRTFs or BRIRs corresponding to the adjusted location information, determining the set of coefficients for the HRTFs or BRIRs by interpolating predefined sets of coefficients for further HRTFs or BRIRs corresponding to further location information.

NEE 6. The method according to any of NEEs 1-5, wherein performing the surround sound virtualization comprises:
performing the surround sound virtualization on the pair of input audio signals independently from the virtualization amount; and
mixing the pair of input audio signals and the virtualized input audio signals based on the virtualization amount.

NEE 7. The method according to any of NEEs 1-6, wherein performing the surround sound virtualization comprises:
determining an effective frequency range for the pair of input audio signals based on the virtualization amount; and
performing the surround sound virtualization on the pair of input audio signals in the determined effective frequency range.

NEE 8. The method according to any of NEEs 1-7, wherein the predefined audio content category includes a category of music, and
wherein determining the virtualization amount comprises:
determining the virtualization amount as a decreasing function of a probability of the set belonging to the category of music.

NEE 9. The method according to any of NEEs 1-7, wherein the predefined audio content category includes a category of non-music, and
wherein determining the virtualization amount comprises:
determining the virtualization amount as an increasing function of a probability of the set belonging to the category of non-music.

NEE 10. The method according to any of NEEs 1-9, wherein the category of non-music includes at least two of a subcategory of speech, a subcategory of background sound, or a subcategory of noise, and
wherein determining the probability of the set of input audio signals belonging to the predefined audio content category comprises:
determining a probability of the set belonging to each of the at least two subcategories; and
determining the probability of the set belonging to the category of non-music based on the determined probabilities for the at least two subcategories.

NEE 11. A system for virtualizing surround sound, comprising:
an audio receiving unit configured to receive a set of input audio signals, each of the input audio signals being indicative of sound from one of different sound sources;
a content confidence determining unit configured to determine a probability of the set of input audio signals belonging to a predefined audio content category;
a virtualization amount determining unit configured to determine a virtualization amount based on the determined probability, the virtualization amount indicating to which extent the set of input audio signals is virtualized as surround sound;
a virtualizer subsystem configured to perform surround sound virtualization on a pair of input audio signals in the set based on the determined virtualization amount and to generate output audio signals based on the virtualized input audio signals and other input audio signals in the set.

NEE 12. The system according to NEE 11, wherein the output signals are used to drive physical speakers at physical locations relative to a listener, and wherein the virtualizer subsystem comprises:
a location adjusting unit configured to adjust predetermined location information for sound sources of the pair of input audio signals based on the virtualization amount and the physical locations of the physical speakers; and
a virtualization unit configured to perform the surround sound virtualization on the pair of input audio signals based on the adjusted location information.

NEE 13. The system according to NEE 12, wherein the virtualization amount determining unit is further configured to modify the virtualization amount in a nonlinear manner, and wherein the location adjusting unit is further configured to adjust the predetermined location information based on the modified virtualization amount.

NEE 14. The system according to any of NEEs 12-13, wherein the virtualization unit is further configured to:
obtain a set of coefficients for head related transfer functions (HRTFs) or BRIRs corresponding to the adjusted location information; and
process the pair of input audio signals based on the obtained set of coefficients.

NEE 15. The system according to NEE 14, wherein the virtualization unit is further configured to:
in response to finding a predefined set of coefficients for the HRTFs or BRIRs corresponding to the adjusted location information, select the predefined set of coefficients; and
in response to missing the predefined set of coefficients for the HRTFs or BRIRs corresponding to the adjusted location information, determine the set of coefficients for the HRTFs or BRIRs by interpolating predefined sets of coefficients for further HRTFs or BRIRs corresponding to further location information.

NEE 16. The system according to any of NEEs 11-15, wherein the virtualizer subsystem comprises:
a virtualization unit configured to perform the surround sound virtualization on the pair of input audio signals independently from the virtualization amount; and
a mixing structure configured to mix the pair of input audio signals and the virtualized input audio signals based on the virtualization amount.

NEE 17. The system according to any of NEEs 11-16, wherein the virtualizer subsystem comprises:
an effective frequency range determining unit configured to determine an effective frequency range for the pair of input audio signals based on the virtualization amount; and
a virtualization unit configured to perform the surround sound virtualization on the pair of input audio signals in the determined effective frequency range.

NEE 18. The system according to any of NEEs 11-17, wherein the predefined audio content category includes a category of music, and
wherein the virtualization amount determining unit is further configured to:
determine the virtualization amount as a decreasing function of a probability of the set belonging to the category of music.

NEE 19. The system according to any of NEEs 11-17, wherein the predefined audio content category includes a category of non-music, and wherein the virtualization amount determining unit is further configured to:
determine the virtualization amount as an increasing function of a probability of the set belonging to the category of non-music.

NEE 20. The system according to any of NEEs 11-19, wherein the category of non-music includes at least two of a subcategory of speech, a subcategory of background sound, or a subcategory of noise, and
wherein the content confidence determining unit is further configured to:
determine a probability of the set belonging to each of the at least two subcategories; and
determine the probability of the set belonging to the category of non-music based on the determined probabilities for the at least two subcategories.

NEE 21. A computer program product for virtualizing surround sound, comprising a computer program tangibly embodied on a machine readable medium, the computer program containing program code for performing the method according to any of NEEs 1 to 10.

NEE 22. A method of virtualizing surround sound, comprising:
receiving a set of input audio signals, each of the input audio signals being indicative of sound from one of different sound sources;
obtaining respective location information of the sound sources of the input audio signals, and respective locations of speakers which are to be driven by output audio signals;
determining a probability of the set of input audio signals belonging to a predefined audio content category;
determining a virtualization amount based on the determined probability, the virtualization amount indicating to which extent the set of input audio signals is virtualized as surround sound;
performing surround sound virtualization on two or more input audio signals in the set based on the determined virtualization amount; and
generating the output audio signals based on the virtualized input audio signals and one or more other input audio signals in the set,
wherein said performing surround sound virtualization comprises performing crosstalk cancellation on the two or more input audio signals, and adjusting the obtained location information of the sound sources such that, for each of the sound sources of the input audio signals, a shortest distance between a virtual location of the sound source and a virtual line through a predefined listening location and one of the obtained speaker locations corresponds to the virtualization amount, whereby the shortest distance is substantially zero when the virtualization amount is zero.

The invention claimed is:
1. A method of virtualizing surround sound, comprising:
receiving a set of input audio signals, each of the input audio signals being indicative of sound from one of different sound sources;
obtaining respective location information of the sound sources of the input audio signals, and respective locations of speakers which are to be driven by output audio signals;
determining a probability of the set of input audio signals belonging to a predefined audio content category;
determining a virtualization amount based on the determined probability, the virtualization amount indicating to which extent the set of input audio signals is virtualized as surround sound;

performing surround sound virtualization on two or more input audio signals in the set based on the determined virtualization amount; and generating the output audio signals based on the virtualized input audio signals and one or more other input audio signals in the set, wherein said performing surround sound virtualization comprises adjusting the obtained location information of the sound sources such that, for each of the sound sources of the input audio signals, a shortest distance between a virtual location of the sound source and a virtual line through a predefined listening location and one of the obtained speaker locations corresponds to the virtualization amount, whereby the shortest distance is substantially zero when the virtualization amount is zero.

2. The method according to claim 1, further comprising:

modifying the virtualization amount in a nonlinear manner, and wherein adjusting the predetermined location information comprises:
adjusting the predetermined location information based on the modified virtualization amount.

3. The method according to claim 2, wherein performing the surround sound virtualization on the two or more input audio signals comprises:

obtaining a set of coefficients for head related transfer functions (HRTFs) or binaural room impulse responses (BRIRs) corresponding to the adjusted location information; and processing the two or more input audio signals based on the obtained set of coefficients.

4. The method according to claim 3, wherein obtaining the set of coefficients comprises:

in response to finding a predefined set of coefficients for the HRTFs or for the BRIRs, selecting the predefined set of coefficients as the obtained set of coefficients; and in response to missing the predefined set of coefficients, determining the obtained set of coefficients by interpolating predefined sets of coefficients for further HRTFs, or for further BRIRs, corresponding to further location information.

5. The method according claim 1, wherein performing the surround sound virtualization further comprises:

determining an effective frequency range for the two or more input audio signals based on the virtualization amount; and performing the surround sound virtualization on the two or more input audio signals in the determined effective frequency range.

6. The method according to, claim 1 wherein the predefined audio content category includes a category of music, and wherein determining the virtualization amount comprises:
determining the virtualization amount as a decreasing function of a probability of the set belonging to the category of music.

7. The method according to claim 1 wherein the predefined audio content category includes a category of non-music, and wherein determining the virtualization amount comprises:
determining the virtualization amount as an increasing function of a probability of the set belonging to the category of non-music.

8. The method according to claim 1 wherein the category of non-music includes at least two of a subcategory of speech, a subcategory of background sound, or a subcategory of noise, and wherein determining the probability of the set of input audio signals belonging to the predefined audio content category comprises:
determining a probability of the set belonging to each of the at least two subcategories; and
determining the probability of the set belonging to the category of non-music based on the determined probabilities for the at least two subcategories.

9. A computer program product for virtualizing surround sound, comprising a computer program tangibly embodied on a non-transitory medium, the computer program comprising program code for performing the method according to claim 1.

10. A computer system comprising a central processing unit configured to perform the method according to claim 1.

* * * * *